United States Patent [19]

Fabry et al.

[11] Patent Number: 5,234,545
[45] Date of Patent: Aug. 10, 1993

[54] PROCESS FOR REGENERATING WASTEPAPER IN THE PRESENCE OF HYDROXYSULFONATE SALTS

[75] Inventors: Bernd Fabry, Korschenbroich; Berthold Schreck, Duesseldorf; Maria Liphard, Essen, all of Fed. Rep. of Germany

[73] Assignee: Henkel Kommanditgesellschaft auf Aktien, Duesseldorf, Fed. Rep. of Germany

[21] Appl. No.: 849,401

[22] PCT Filed: Oct. 18, 1990

[86] PCT No.: PCT/EP90/01765
§ 371 Date: Apr. 24, 1992
§ 102(e) Date: Apr. 24, 1992

[87] PCT Pub. No.: WO91/06701
PCT Pub. Date: May 16, 1991

[30] Foreign Application Priority Data
Oct. 27, 1989 [DE] Fed. Rep. of Germany ....... 3935761

[51] Int. Cl.$^5$ .............................................. D21C 5/02
[52] U.S. Cl. ................................................ 162/7; 162/8
[58] Field of Search ................................... 162/5, 6, 7, 8

[56] References Cited

U.S. PATENT DOCUMENTS
4,865,774 11/1989 Fabry et al. ........................... 252/554

FOREIGN PATENT DOCUMENTS
155793 8/1985 Japan ..................................... 162/5

OTHER PUBLICATIONS
Abstract Bulletin of the Institute of Paper Chemistry, vol. 57, No. 4, Oct. 1986 #5589.

Primary Examiner—Karen M. Hastings
Attorney, Agent, or Firm—Ernest G. Szoke; Wayne C. Jaeschke; Real J. Grandmaison

[57] ABSTRACT

The invention relates to a process for regenerating wastepaper and to the use of certain hydroxysulfonate salts for removing printing ink from printed wastepaper and/or paper circuit waters.

7 Claims, No Drawings

PROCESS FOR REGENERATING WASTEPAPER IN THE PRESENCE OF HYDROXYSULFONATE SALTS

BACKGROUND OF THE INVENTION

1. Field of the Invention

This invention relates to a process for regenerating wastepaper and to the use of hydroxysulfonate salts for removing printing inks from printed wastepaper and/or paper circuit waters.

2. Discussion of Related Art

Today, wastepaper is used in large quantities for the production of, for example, newsprint and sanitary paper. Lightness and color are important quality features for papers of this type. To achieve high-quality papers, the printing inks have to be removed from the printed wastepaper. This is normally done by deinking processes essentially comprising two steps, namely:

1. disintegrating the wastepaper, i.e. fiberizing in water in the presence of the chemicals required for detachment of the printing ink particles and
2. removal of the detached printing ink particles from the fiber suspensions.

The second step can be carried out by washing or flotation (Ullmanns Encyclopädie der technischen Chemie, 4th Edition, Vol. 17, pages 570–571 (1979)). In flotation, which utilizes the difference in wettability between printing inks and paper fibers, air is forced or drawn through the fiber suspensions. Small air bubbles attach themselves to the printing ink particles and form a froth at the surface of the water which is removed by savers.

The deinking of wastepaper is normally carried out at alkaline pH values in the presence of alkali metal hydroxides, alkali metal silicates, oxidative bleaches and surfactants at temperatures in the range from 30° to 50° C. The surfactants, which detach and separate the printing ink particles, are mainly anionic and/or nonionic types, for example soaps, ethoxylated fatty alcohols and/or ethoxylated alkyl phenols (Wochenblatt für Papierfabrikation 17, 646 to 649 (1985)). JP 61/207686, reported in Chem. Abstr. 106, 121694v, describes the use of aliphatic α-sulfocarboxylic acids and aliphatic α-sulfocarboxylic acid esters in flotation deinking processes. According to Russian patents SU 773 174, reported in Derwent 51102 D/28, and SU 717 195, reported in Derwent 72992 C/41, good results in the flotation of printing inks are obtained by treating wastepaper with mixtures containing alkyl sulfonates and soaps.

However, the deinking results obtained with known surfactants are often unsatisfactory. Accordingly, the object addressed by the present invention was to provide a process for regenerating wastepaper which would enable the removal of printing ink from printed wastepaper to be distinctly improved.

DESCRIPTION OF THE INVENTION

Other than in the operating examples, or where otherwise indicated, all numbers expressing quantities of ingredients or reaction conditions used herein are to be understood as modified in all instances by the term "about."

It has now been found that paper having very high degrees of whiteness can be obtained by using certain hydroxysulfonate salts in processes for regenerating wastepaper. It has also been found that printing inks can also be removed from paper circuit waters with hydroxysulfonate salts.

Accordingly, the present invention relates to a process for regenerating wastepaper which is characterized in that printed wastepaper is disintegrated in the presence of alkali metal, alkaline-earth metal and/or of ammonium salts of hydroxysulfonates prepared by sulfonation of alkenyl esters and/or alkenyl polyoxyalkyl esters corresponding to the following general formula

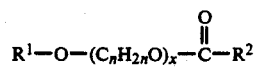

in which the substituents $R^1$ represent a linear $C_{16-22}$ alkenyl group or a fatty alkenyl group containing palmitoleyl, oleyl, linoleyl, gadoleyl and/or erucyl groups and $R^2$ represents H or a $C_{1-3}$ alkyl group, n is the number 2, 3 and/or 4 and x is a number of 0 to 30, and subsequent hydrolysis of the sultone and ester groups, and the detached printing ink particles are subsequently removed from the paper stock suspensions in known manner by flotation or washing.

The present invention also relates to the use of alkali metal, alkaline-earth metal and/or ammonium salts of hydroxysulfonates prepared by sulfonation of alkenyl esters and/or alkenyl polyoxyalkyl esters corresponding to the following general formula

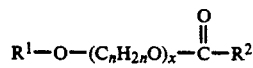

in which the substituents $R^1$ represent a linear $C_{16-22}$ alkenyl group or a fatty alkenyl group containing palmitoleyl, oleyl, linoleyl, gadoleyl and/or erucyl groups and $R^2$ represents H or a $C_{1-3}$ alkyl group, n is the number 2, 3 and/or 4 and x is a number of 0 to 30, and subsequent hydrolysis of the sultone and ester groups, for the removal of printing inks from printed wastepaper and/or paper circuit waters.

The hydroxysulfonate salts to be used in accordance with the invention may be obtained by the process described in DE-OS 37 25 030. (U.S. Pat. No. 4,865,774) The educts used for the esters corresponding to the general formula are linear alkenyl alcohols of natural and/or synthetic origin, for example palmitoleyl alcohol, oleyl alcohol, linoleyl alcohol, gadoleyl alcohol and/or erucyl alcohol and/or technical grade alcohol mixtures containing one or more of the unsaturated alcohols mentioned above. Preferred educts are naturally occurring alkenyl alcohols containing 18 C atoms, such as oleyl alcohol or technical grade alcohol mixtures containing oleyl alcohol, for example cetyl/oleyl and/or oleyl/linoleyl alcohol mixtures having iodine values of 50 to 130. The presence of saturated alcohols, such as cetyl and/or stearyl alcohol, in technical grade alcohol mixtures is not problematical. The commercially available alkenyl alcohols and alkenyl alcohol mixtures can be obtained by hydrogenation of unsaturated carboxylic acids or technical grade mixtures containing unsaturated fatty acids.

Where alkoxylated unsaturated alcohols are used, alkenyl alcohols are reacted with ethylene oxide, propylene oxide and/or butylene oxide, preferably with ethylene oxide, by known industrial processes (cf. for example "Chemische Technologie", Vol. 7, pp. 131–132, Carl-Hanser-Verlag, München-Wien 1986)).

The average degree of alkoxylation x of the mixtures of homologous alkoxylates obtained corresponds to the molar quantity of the alkylene oxides added on and is preferably at most 10.

The hydroxyl group of the alkenyl alcohols and/or the alkoxylated alkenyl alcohols is esterified by methods known per se, for example by reaction of the unsaturated alcohols with carboxylic acids corresponding to the general formula $R^2$—COOH in the presence of catalysts, for example concentrated sulfuric acid or ground tin, at the boiling temperature with simultaneous removal of the water of reaction formed by distillation. In addition, the esterification may also be carried out in known manner with carboxylic anhydrides corresponding to the general formula $R^2COOCOR^2$. Suitable carboxylic acids and carboxylic anhydrides are formic acid, acetic acid, propionic acid and/or butyric acid and/or the corresponding anhydrides of these acids. Acetic acid and/or acetic anhydride are preferably used for the esterification.

The sulfonations of the esters corresponding to the general formula are carried out with $SO_3$-containing gas mixtures, preferably with gas mixtures of $SO_3$ and air or inert gases, such as nitrogen, in which the $SO_3$ content is between 1 and 8% by volume, at temperatures of 10° to 80° C. and preferably at temperatures of 20° to 50° C. Based on the double bonds, $SO_3$ is normally used in an equimolar quantity or in a molar excess of up to 50%. The sulfonations are carried out continuously or discontinuously in typical reactors suitable and widely used for the sulfatization of fatty alcohols or for the sulfonation of fatty acid esters, alkyl benzenes or olefins, for example in reactors of the falling film type (cf. for example in Kirk-Othmer: Encyclopedia of Chemical Technology 22, 28 et seq 1983)).

On completion of sulfonation, the product obtained is introduced into an aqueous solution of alkali metal hydroxides, alkaline earth metal hydroxides and/or ammonium hydroxide. 1 to 2.5 mol hydroxide are used per mol sulfur trioxide added. To convert the sultones initially formed during sulfonation into hydroxysulfonates and to hydrolyze the ester groups, the aqueous solutions containing hydroxides are heated, for example, to the boiling temperature under normal pressure.

The hydroxysulfonate salts to be used in accordance with the invention are preferably added to paper stock suspensions in quantities of 0.02 to 2% by weight and more preferably in quantities of 0.1 to 0.8% by weight, based on air-dry paper stock. Air-dry paper stock means that an equilibrium state of internal moisture has been established in the paper stock. This equilibrium state depends on the temperature and relative humidity of the air.

In many cases, the deinking result, i.e. the removal of printing inks from printed wastepaper, can be improved if the hydroxysulfonate salts to be used in accordance with the invention are used in combination with, for example, $C_{10\text{-}22}$ fatty acids, such as Olinor ®4010, Olinor ®4020 and/or Olinor ®DG40 (all products of Henkel KGaA), ethoxylated alkyl alcohols containing 6 to 22 carbon atoms, ethoxylated alkyl phenols, polymers, such as polyacrylamides and/or polydimethyl aminoethyl methacrylates, and/or copolymers, for example of the type described in DE 38 39 479, in quantities of 0.01 to 1% by weight, based on air-dry paper stock, and/or with layer compounds precipitated in situ having the following general composition $$M(II)_{1-x}M(III)_x(OH)_2(A^{z-})_{x/z} \cdot nH_2O$$

in which M(II) represents divalent metal cations, M(III) represents trivalent metal cations and $A^{z-}$ represents anions of monobasic and/or polybasic acids, x is a number of 0.01 to 0.5 and n is a number of 0 to 20, described in DE 39 09 568 The molar ratio of divalent metal cations to trivalent metal cations in layer compounds precipitated in situ is preferably between 20:1 and 1:1. Trivalent metal cations may be used in quantities of 0.3 to 2% by weight, based on air-dry paper stock.

In the presence of hydroxysulfonate salts, water-dilutable and/or solvent-containing printing inks, for example rotary newsprint inks, book printing inks, offset printing inks, illustration intaglio printing inks, flexographic printing inks, laser printing inks and/or packaging intaglio printing inks, may be removed from printed wastepaper, for example newspapers, magazines, computer paper, journals, brochures, forms, telephone directories and/or catalogues. The wastepaper deinked by the process according to the invention is distinguished by very high degrees of whiteness.

Printed wastepaper is refined at 20° to 60° C. in a pulper in an aqueous solution typically containing 0 to 1.5% by weight hydrogen peroxide (100%), 0 to 2.5% by weight 99% by weight NaOH, 0 to 4 0% by weight soda water-glass having a solids content of 35% by weight (37 to 40° Be), 0.02 to 2% by Weight hydroxysulfonate salts according to the invention and optionally one or more of the optional constituents mentioned above in the quantities indicated—all percentages by weight are based on air-dry wastepaper—at pulp densities of, for example, 1 to 5% by weight. The paper stock suspensions are then stirred into water or water is added to them so that 0.6 to 1.6% by weight paper stock suspensions are obtained. After a residence time of 60 to 120 minutes at temperatures in the range from 20° to 60° C., the detached printing ink particles are then removed from the fiber suspensions in known manner by washing or flotation, preferably by flotation, for example in a Denver flotation cell.

Where the compounds according to the invention are used, printing inks are removed both from the wastepaper and from the circuit water. The compounds according to the invention may also be used for the separate treatment of paper circuit waters. In cases such as these, the printing ink particles are removed, for example by filtration or flotation, after the addition of 2 to 100 mg of the compounds according to the invention per liter circuit water.

EXAMPLES

EO stands for ethylene oxide

EXAMPLE 1

Preparation of oleyl alcohol hydroxysulfonate, sodium salt

A technical grade mixture of oleyl and cetyl alcohol in a ratio by weight of 1:1 (HD-Ocenol(®) 50/55, iodine value 55, hydroxyl value 215; a product of Henkel KGaA) was converted into the corresponding acetate by reaction with acetic anhydride (20 mol-% excess) for 4 hours at 118° C. The reaction mixture was then poured onto ice water, the organic phase washed repeatedly with water was dried over sodium sulfate and then distilled.

310 g (1 mol) of the ester obtained (iodine value=41, saponification value = 181) were sulfonated with 52 g (0.65 mol) $SO_3$ in an 800 ml sulfonation reactor equipped with a jacket cooling system and a gas inlet pipe. Sulfur trioxide was driven out from a corresponding quantity of oleum by heating, diluted with nitrogen to a concentration of 5% by volume and introduced into the oleyl acetate over a period of 10 minutes, the temperature of the reaction mixture being kept below 40° C. by cooling. On completion of sulfonation, the reaction mixture was cooled, stirred into an aqueous solution of 68 g (1.7 mol) NaOH and 1500 g water and then hydrolyzed for 4 hours on a steam bath at 95 to 100° C. After cooling to 20° C., the pH value of the reacting mixture was adjusted to 7.0 by addition of hydrochloric acid solution.

The product obtained had the following characteristics:

| | |
|---|---|
| Anionic surfactant (DGF-H-III-10): | 0.031 mEq/g |
| Unsulfonated fractions (DGF-G-III-6b): | 11.6% by weight |
| Sodium sulfate content: | 3.1% by weight |
| Sodium acetate content: | 5.3% by weight |
| Water content: | 70% by weight |
| Average molecular weight: | 318 |
| Klett color value: | 20 |

EXAMPLE 2

Preparation of oleyl alcohol-5 mol EO-hydroxysulfonate, sodium salt

A technical grade mixture of oleyl and cetyl alcohol in a ratio by weight of 1:1 (HD-Ocenol(®) 50/55) was alkoxylated with 5 mol ethylene oxide per mol alcohol mixture at 170° C. in the presence of sodium methylate as catalyst and the alkoxylation product obtained was converted into the corresponding acetate by reaction with acetic anhydride (20 mol% excess) for 4 hours at 118° C. The reaction mixture was then poured onto ice water, the organic phase washed repeatedly with water was dried over sodium sulfate and then distilled.

530 g (1 mol) of the ester obtained (iodine value=25, saponification value=106) were sulfonated with 52 g (0.65 mol) $SO_3$ in an 800 ml sulfonation reactor equipped with a jacket cooling system and a gas inlet pipe. Sulfur trioxide was driven out from a corresponding quantity of oleum by heating, diluted with nitrogen to a concentration of 5% by volume and introduced into the oleyl ether acetate over a period of 10 minutes, the temperature of the reaction mixture being kept below 40° C. by cooling. On completion of sulfonation, the reaction mixture was worked up in the same way as in Example 1.

The product obtained had the following characteristics:

| | |
|---|---|
| Anionic surfactant (DGF-H-III-10): | 0.020 mEq/g |
| Unsulfonated fractions (DGF-G-III-6b): | 11.2% by weight |
| Sodium sulfate content: | 3.1% by weight |
| Sodium acetate content: | 5.2% by weight |
| Water content: | 70% by weight |
| Average molecular weight: | 538 |
| Klett color value: | 18 |

EXAMPLE 3

Preparation of oleyl alcohol-10 mol EO-hydroxysulfonate, sodium salt

As in Example 2 technical grade oleyl alcohol (HD-Ocenol(®) 90/95, iodine value 94, hydroxyl value 210; a product of Henkel KGaA) was alkoxylated with 10 mol ethylene oxide and converted with acetic anhydride into the corresponding acetate.

750 g (1 mol) of the ester obtained (iodine value= 34, saponification value=75) were sulfonated with 104 g (1.3 mol) $SO_3$ in a 1000 ml sulfonation reactor equipped with a jacket cooling system and a gas inlet pipe Sulfur trioxide was driven out from a corresponding quantity of oleum by heating, diluted with nitrogen to a concentration of 5% by volume and introduced into the oleyl ether acetate over a period of 10 minutes, the temperature of the reaction mixture being kept below 40° C. by cooling. On completion of sulfonation, the reaction mixture was cooled, stirred into an aqueous solution of 96 g (2.4 mol) sodium hydroxide and 2000 g water and then hydrolyzed for 4 hours on a steam bath at 95° to 100° C. After cooling to 20° C., the pH value of the reaction mixture was adjusted to 7.0 by addition of hydrochloric acid solution.

The product obtained had the following characteristics:

| | |
|---|---|
| Anionic surfactant (DGF-H-III-10): | 0.021 mEq/g |
| Unsulfonated fractions (DGF-G-III-6b): | 5.5% by weight |
| Sodium sulfate content: | 3.1% by weight |
| Sodium acetate content: | 5.1% by weight |
| Water content: | 70% by weight |
| Average molecular weight: | 758 |
| Klett color value: | 18 |

APPLICATION EXAMPLES 20 g air-dry (=18.4 g bone-dry for 8.3% moisture;) printed wastepaper consisting of 50% by weight newspapers and 50% by weight magazines were disintegrated for 10 minutes at 45° C. in a Starmix, stage 2, in 520 ml of an aqueous solution containing 2.0% by weight soda waterglass, solids content 35% by weight (37-40° Be), 2.33% by weight hydrogen peroxide, 30% by weight, 1.0% by weight sodium hydroxide, 99% by weight, and 0.4% by weight active substance of a hydroxysulfonate salt according to the invention (all percentages by weight are based on air-dry paper stock). The pulp was then diluted with water to 1.84 l and left standing for 1.5 hours at 45° C. The pulp thus diluted was then floated for 12 minutes at 45° C. in a Denver laboratory flotation cell at 300 revolutions per minute After flotation, the pulp was separated from the water (circuit water) on a suction filter paper, formed into a sheet between two filter papers on a photo dry press and dried for 90 minutes at 100° C.

The deinking results are shown in Table 1. The deinkability value (DEM) was calculated from the reflection factors $R_{457nm}$ (whiteness) of the printed (BS), deinked (DS) and unprinted (US) paper stock in accordance with the following formula:

$$DEM(\%) = \frac{\text{whiteness } (DS) - \text{whiteness } (BS)}{\text{whiteness } (US) - \text{whiteness } (BS)} \times 100$$

(0% means no deinking, 100% means quantitative deinking).

In every case, the circuit water was clear.

TABLE 1

| Hydroxysulfonate salts used, prepared in accordance with Example | $R_{457}$ | $R_{457}$ | $R_{457}$ | DEM (%) |
|---|---|---|---|---|
| 1 | 37.3 | 60.5 | 53.4 | 69 |
| 2 | 37.3 | 60.5 | 54.3 | 73 |
| 3 | 37.3 | 60.5 | 54.3 | 73 |

We claim:

1. The process of regenerating wastepaper containing printing ink comprising the steps of;
   (1) fiberizing said wastepaper in an aqueous alkaline deinking solution containing a deinking effective quantity of an alkali metal, alkaline earth metal, or ammonion salt of a hydroxysulfonate prepared by sulfonating an alkenyl ester or alkenyl polyoxyalkyl ester corresponding to the formula

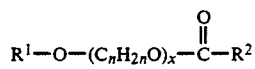

in which the substituent $R^1$ represents a linear $C_{16-22}$ alkenyl group or a fatty alkenyl group containing palmitoleyl, oleyl, linoleyl, gadoleyl or erucyl group, $R^2$ represents H or a $C_{1-3}$ alkyl group, n is the number 2, 3 or 4 and x is a number of 0 to about 30, and subsequently hydrolyzing the sultone and ester groups, and
   (2) removing the detached ink particles from the deinking solution.

2. A process as in claim 1 wherein said hydroxysulfonate is present in an amount of from about 0.02 to about 2% by weight, based on the air-dry weight of said wastepaper.

3. A process as in claim 1 wherein in said formula, n is the number 2, and x is a number of 0 to about 10.

4. A process as in claim 1 wherein in said formula, $R^2$ is a methyl group.

5. A process as in claim 1 wherein in said formula, $R^1$ is an oleyl group or a fatty alkenyl group containing an oleyl group.

6. A process as in claim 1 wherein said solution contains from 0 to about 1.5% by weight of 100%/wt hydrogen peroxide, from 0 to about 2.5% by weight of sodium hydroxide, and from 0 to about 4% by weight of soda waterglass having a solids content of about 35%/wt, based on the air-dry weight of said wastepaper.

7. A process as in claim 1 wherein said fiberizing step is conducted at a temperature of from about 20° to about 60° C. for a period of about 60 to about 120 minutes.

* * * * *